(12) United States Patent
Smith

(10) Patent No.: US 9,681,373 B2
(45) Date of Patent: Jun. 13, 2017

(54) BEACON JITTER PREDICTION FOR WIRELESS LOCAL AREA NETWORK (LAN) DEVICES

(71) Applicant: DSP Group LTD., Herzeliya (IL)

(72) Inventor: Graham Kenneth Smith, El Dorado Hills, CA (US)

(73) Assignee: DSP GROUP LTD., Herzliya (IL)

(*) Notice: Subject to any disclaimer, the term of this patent is extended or adjusted under 35 U.S.C. 154(b) by 270 days.

(21) Appl. No.: 14/298,987

(22) Filed: Jun. 9, 2014

(65) Prior Publication Data

US 2014/0376432 A1    Dec. 25, 2014

Related U.S. Application Data

(60) Provisional application No. 61/837,190, filed on Jun. 20, 2013.

(51) Int. Cl.
*H04W 84/12* (2009.01)
*H04W 88/02* (2009.01)
*H04W 52/02* (2009.01)

(52) U.S. Cl.
CPC .... *H04W 52/0206* (2013.01); *H04W 52/0225* (2013.01); *H04W 52/0232* (2013.01); *H04W 84/12* (2013.01); *H04W 88/02* (2013.01); *Y02B 60/50* (2013.01)

(58) Field of Classification Search
CPC ..... H04W 4/005–4/006; H04W 40/24; H04W 40/244; H04W 52/0209–52/0232; H04W 52/0241–52/0248
See application file for complete search history.

(56) References Cited

U.S. PATENT DOCUMENTS

2013/0034004 A1* 2/2013 Mannemala ...... H04W 52/0216
                                                              370/252
2013/0044658 A1* 2/2013 Zhu .................. H04W 56/0035
                                                              370/311

* cited by examiner

*Primary Examiner* — Eric Myers
(74) *Attorney, Agent, or Firm* — Reches Patents

(57) ABSTRACT

A method for activating a wireless communication device, the method may include receiving, by the wireless communication device, a sequence of periodic transmissions; estimating, for each periodic transmission of the sequence of periodic transmissions and before a reception of the periodic transmission, an expected time of arrival of the periodic transmission; calculating, for each periodic transmission, a timing difference attribute that is responsive to at least a difference between a timing of arrival of the periodic transmission and an expected time of arrival of the periodic transmission; selecting a selected periodic transmission out of the sequence of periodic transmissions, wherein the selected periodic transmission is associated with a smallest timing difference attribute out of the timing difference attributes associated with the periodic transmissions of the sequence of periodic transmissions; estimating, before a reception of a future periodic transmission that does not belong to the sequence of periodic transmissions, an estimated time of arrival of the future periodic transmission in response to the selecting of the selected periodic transmission and a periodic transmission period; determining a wakening time for wakening the wireless communication device in response to the estimated time of arrival of the future periodic transmission; and wakening the wireless communication device at the wakening time and searching for the future periodic transmission.

27 Claims, 13 Drawing Sheets

BEACON JITTER PREDICTION FOR WIRELESS LOCAL AREA NETWORK (LAN) DEVICES

RELATED APPLICATIONS

This application claims priority from U.S. provisional patent Ser. No. 61/837,190 filing date Jun. 20, 2013.

FIELD OF THE INVENTION

This invention relates to the field of wireless local area networks.

BACKGROUND TO THE INVENTION

In a network based upon IEEE 802.11, stations can enter a power save state. When in a power save state, the station (STA) is required to wake up periodically in order to receive a beacon from the network controller—an access point (AP) in the case of an infrastructure network or a group owner (GO) in the case of a Wi-Fi Direct connection.

In the following description the infrastructure network with an AP will be used. The same description would apply to the Wi-Fi Direct network when a GO is used.

When a STA indicates to the AP to which it is associated that it is in the power save state and sleeping, the AP will buffer packets for that STA and then indicate in beacons if there are buffered packets for that STA. By waking up periodically in order to receive beacons, the STA can then determine if there are buffered packets for it and then perform the correct procedures in order to retrieve them.

When sleeping, the STA wants to wake up, receive the beacon and then go back to sleep again as soon as practical such that power consumption is minimized. The AP is required by the 802.11 standard to schedule the beacon transmission to be transmitted at a regular interval, known as target beacon transmission time, TBTT, but the beacon transmissions can be subject to significant unpredictable delay and jitter. This may occur, if the network is heavily loaded, or subject to interference from, for example, overlapping networks or networks on adjacent channels, or if there is heavy uplink traffic from STAs to the AP. then. In fact, APs often exhibit beacon jitter even when traffic is not that heavy due to the AP carrying out other tasks such as scanning and upper layer applications which can delay the transmission of the beacon. The STA when operating in the power save state needs to predict when the beacon is due to be transmitted as waking up too early will waste power and waking up too late will mean that the beacon could be missed. The basic objective therefore for the STA is to determine the correct TBTT and to hence have a high probability of receiving the Beacon, and to be active for the shortest possible time.

Consider the case of the first beacon received by the STA. The STA does not know if this beacon is on time or delayed but it does know that the AP attempts to schedule its beacons at a regular time, TBTT. If one beacon is delayed, the next beacon is still scheduled to be transmitted at the regular time, i.e. the delay is only for that one beacon. Hence, when receiving beacons all that is known is the TBTT but the effective starting point is not known.

FIG. 1 illustrates the case where beacons are jittering and subject to varying delays.

If the AP was scheduling its beacons with zero jitter, then each beacon would be transmitted with exactly TBTT spacing. The expected time between beacons TBTT, is shown as Tb 1 in the diagram. Let the correct time, assuming no delay, of the nth beacon be Tn, and the delay on the nth beacon be $\Delta n$, such that the actual time that the nth beacon was transmitted is $To+nTb+\Delta n$. Each STA maintains a copy of the timing synchronization function, TSF, which is a local timer that is synchronized to the timing of the AP.

TSF is used in the following analysis, as follows: 'Actual TSF' is the time that a beacon was received, and 'Predicted TSF' is the 'Actual TSF' of the previous beacon plus TBTT, Tb. The first beacon is received at time To 2. The next beacon is then predicted to arrive at time To+Tb 3. The actual time of arrival is $To+Tb+\Delta_1$ 4.

The table below shows the relationships between the beacon number, the Actual TSF, the Predicted TSF. In the fourth column the difference between the Actual and Predicted TSF is shown.

| Beacon # | Actual TSF | Predicted TSF | Difference (Actual − predicted TSF) |
|---|---|---|---|
| 0 | $To + \Delta o$ | | |
| 1 | $T_1 = To + Tb + \Delta_1$ | $To + Tb + \Delta o$ | $\Delta_1 - \Delta o$ |
| 2 | $T_2 = To + 2Tb + \Delta_2$ | $To + 2Tb + \Delta_1$ | $\Delta_2 - \Delta_1$ |
| 3 | $T_3 = To + 3Tb + \Delta_3$ | $To + 3Tb + \Delta_2$ | $\Delta_3 - \Delta_2$ |
| n | $T_n = To + nTb + \Delta_n$ | $To + nTb + \Delta_{n-1}$ | $\Delta_n - \Delta_{n-1}$ |

Note that the difference for the nth beacon is $\Delta n-\Delta n-1$. If the nth beacon is sent at the correct time, then the delay on the nth beacon, $\Delta n$, will be zero. One prior art method aims to identify the beacon that was transmitted at the correct time. Simply determining the minimum difference value only serves to identify when two successive beacons were sent with the same delay, but by identifying such occurrences it may be possible to either assume that these represents beacons that are sent on time, or, by carrying out some statistical analysis, such as looking at the number of times this occurred and comparing the actual received times it would be possible to identify the correct timing by assuming that the majority of these occurrences are when the beacons are on time. This method is not always accurate and safety margins need to be used to account for the inaccuracy.

Another prior art method is to store the time of the first beacon and then subtract that value from the TSF of each subsequent beacon as follows:

Time of first beacon=$To+\Delta o$

Time of $n$th Beacon,$Tn=To+nTb+\Delta n$

Difference=$(To+nTb+\Delta n)-(To+\Delta o)=nTb+\Delta n-\Delta o$

The value of nTb (n*Tb) which is the product of the number of beacons received and the TBTT, is known, and hence can be subtracted from the difference to produce the result $\Delta n-\Delta o$. This can be carried out for each beacon and the STA can determine the minimum value of $\Delta n-\Delta o$. The minimum value is then assumed to represent the case when the beacon was on time such that $\Delta n=0$. Hence, the value of the delay of the first received beacon, $\Delta o$ is now known. By subtracting the value of $\Delta o$ from the time of the first beacon, the method obtains a value for To and hence the time of the (n+1)th beacon can be predicted simply as $Tn=To+(n+1)Tb$.

This prior art method requires that the time of the first beacon is stored, and the number of beacons is also accurately counted. The calculation also needs to be carried out on every beacon looking for the minimum value of $\Delta n-\Delta o$. This prior art method can result in an accurate estimation of the actual beacon times but it relies upon storing the original beacon time in memory and maintaining an accurate count of the beacons, including any missed beacons. Problems also occur if the beacon timing undergoes a shift or an adjustment in time, and unfortunately this does happen.

SUMMARY OF THE INVENTION

According to an embodiment of the invention there may be provided a method for activating a wireless communication device, the method may include receiving, by the wireless communication device, a sequence of periodic transmissions; estimating, for each periodic transmission of the sequence of periodic transmissions and before a reception of the periodic transmission, an expected time of arrival of the periodic transmission (for example predicted TSF of table 1 and IntTSF of table 2); calculating, for each periodic transmission, a timing difference attribute (for example "difference" of tables 1 and 2) that may be responsive to at least a difference between a timing of arrival (for example Actual TSF of tables 1 and 2) of the periodic transmission and an expected time of arrival of the periodic transmission; selecting a selected periodic transmission out of the sequence of periodic transmissions, wherein the selected periodic transmission is associated with a smallest timing difference attribute out of the timing difference attributes associated with the periodic transmissions of the sequence of periodic transmissions; estimating, before a reception of a future periodic transmission that does not belong to the sequence of periodic transmissions, an estimated time of arrival of the future periodic transmission in response to the selecting of the selected periodic transmission and a periodic transmission period (for example Tb of tables 1 and 2); determining a wakening time for wakening the wireless communication device in response to the estimated time of arrival of the future periodic transmission; and wakening the wireless communication device at the wakening time and searching for the future periodic transmission.

The estimating, for each periodic transmission of the sequence of periodic transmissions, of the expected time of arrival of the periodic transmission may be responsive (see, for example table 1) to a timing of arrival of a preceding periodic transmission and the periodic transmission period of the sequence (see, for example, Tb of tables 1 and 2).

A timing difference attribute of a periodic transmission may be a sum of timing differences (see, for example, "Sum Difference" of table 1) associated with all periodic transmissions of the sequence that do not follow the periodic transmission.

The method may include extracting, in response to the smallest timing difference, an actual delay (see, for example Δo of table 1) associated with a reception of a first periodic transmission of the sequence of periodic transmissions.

The estimating, for each periodic transmission of the sequence of periodic transmissions, of the expected time of arrival of the periodic transmission may be responsive (see, for example table 2) to (a) a timing of arrival of a preceding periodic transmission, (b) a timing difference between an estimated timing of arrival of the preceding periodic transmission and an actual timing of arrival of the preceding periodic transmission, and (c) the periodic transmission period of the sequence (Tb).

The method may include determining whether the wireless communication device missed a periodic transmission and wherein the determining of the wakening time may be responsive to whether the wireless communication device missed the periodic transmission.

The method may include calculating the wakening time as being equal to an expected time of reception of a next periodic transmission that minus a safety period (see, for example, WakeOffset of FIG. 5).

The duration of the safety period may be responsive to a success of the wireless communication device in receiving periodic transmissions.

The duration of the safety period may be responsive to a success of the wireless communication device in receiving periodic transmissions.

The method may include searching for missed periodic transmissions and compensating for a missed periodic transmission.

The periodic transmission may be a beacon.

According to an embodiment of the invention there may be provided a non-transitory computer readable medium that stores instructions that once executed by a wireless communication device cause the wireless communication device to receive a sequence of periodic transmissions; estimate, for each periodic transmission of the sequence of periodic transmissions, an expected time of arrival of the periodic transmission; calculate, for each periodic transmission, a timing difference attribute that may be responsive to at least a difference between a timing of arrival of the periodic transmission and an expected time of arrival of the periodic transmission; select a selected periodic transmission out of the sequence of periodic transmissions, wherein the selected periodic transmission is associated with a smallest timing difference attribute out of the timing difference attributes associated with the periodic transmissions of the sequence of periodic transmissions; estimate, before a reception of a future periodic transmission that does not belong to the sequence of periodic transmissions, an estimated time of arrival of the future periodic transmission in response to the selecting of the selected periodic transmission and a periodic transmission period; determine a wakening time for wakening a wireless communication device in response to the estimated time of arrival of the future periodic transmission; and waken at the wakening time and searching for the future periodic transmission.

According to an embodiment of the invention there may be provided a wireless communication device that may include an interface a processor. The interface may be arranged to receive a sequence of periodic transmissions. The processor may be arranged to estimate, for each periodic transmission of the sequence of periodic transmissions and before a reception of the periodic transmission, an expected time of arrival of the periodic transmission; calculate, for each periodic transmission, a timing difference attribute that may be responsive to at least a difference between a timing of arrival of the periodic transmission and an expected time of arrival of the periodic transmission; select a selected periodic transmission out of the sequence of periodic transmissions, wherein the selected periodic transmission is associated with a smallest timing difference attribute out of the timing difference attributes associated with the periodic transmissions of the sequence of periodic transmissions; estimate, before a reception of a future periodic transmission that does not belong to the sequence of periodic transmissions, an estimated time of arrival of the future periodic transmission in response to the selecting of the selected periodic transmission and a periodic transmission period; determine a wakening time for wakening the wireless communication device in response to the estimated time of arrival of the future periodic transmission; and waken the wireless communication device at the wakening time and searching for the future periodic transmission.

According to an embodiment of the invention there may be provided a wireless communication device that includes a receiver and a processor. The receiver is arranged to receive a sequence of periodic transmissions. The processor is arranged to estimate, for each periodic transmission of the sequence of periodic transmissions and before a reception of the periodic transmission, an expected time of arrival of the periodic transmission; calculate, for each periodic transmission, a timing difference attribute that is responsive to at least a difference between a timing of arrival of the periodic transmission and an expected time of arrival of the periodic transmission; select a selected periodic transmission out of the sequence of periodic transmissions, wherein the selected periodic transmission is associated with a smallest timing difference attribute out of the timing difference attributes associated with the periodic transmissions of the sequence of periodic transmissions; estimate, before a reception of a future periodic transmission that does not belong to the sequence of periodic transmissions, an estimated time of arrival of the future periodic transmission in response to the selecting of the selected periodic transmission and a periodic transmission period; determine a wakening time for wakening the wireless communication device in response to the estimated time of arrival of the future periodic transmission; and wherein the wireless communication device is arranged to awake at the wakening time and searching for the future periodic transmission. It is noted that the wireless communication device may enter a sleep mode after determining the wakening time. During the sleep mode only a portion of the wireless communication device is awake—in order to allow the awakening of wireless communication device. This portion may be the processor, a part of the processor or a timer circuit. The processor may be a general purpose processor, a dedicated processor such as a digital signal processor, and the like. The processor may execute instructions that cause the processor to execute any method illustrated in the specification.

BRIEF DESCRIPTION OF DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE DRAWINGS

Figure 1:
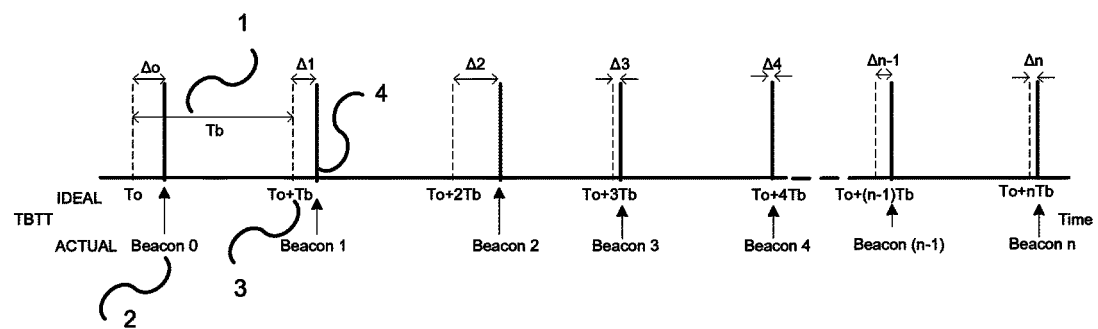
FIG. 1 is a prior art timeline diagram indicating beacon transmissions.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

According to an embodiment of the invention there may be provided a wireless communication device that may include an interface and a processor; wherein the interface may be arranged to receive input signals; wherein the processor may be arranged to: determine the time of arrival of the received input signal; decode the received input signal calculate the time of arrival of the next expected received input signal. The received input signal is a beacon management frame.

According to an embodiment of the invention there may be provided a wireless communication device wherein the processor may be arranged to calculate time of arrival of the next expected beacon frame by adding the beacon period to the time of arrival of the beacon.

The processor may be arranged to calculate a timing value, IntTSF, and a timing difference, Diff, for each beacon wherein the Timing Value, IntTSF=Actual time of arrival of the previous beacon plus beacon period, minus the timing difference of the previous beacon, and the Timing Difference, Diff=Actual time of arrival of present beacon−IntTSF of the previous beacon.

The processor may be arranged to calculate and record the minimum value of the timing difference for a series of beacons The processor may be arranged to calculate the minimum value of the timing difference and record it for different sets of beacons The processor may arranged to calculate the predicted earliest time of arrival of a beacon by adding the minimum value of the timing difference to the timing value for that beacon According to an embodiment of the invention there may be provided a wireless communication device that may include an interface and a processor wherein the time at which the wireless communication device will wake for a beacon may be governed by a wake offset time. Wherein the wake offset time may be defined as the time that the wireless communications device will wake ahead of the predicted earliest time of arrival for the beacon, wherein the minimum value for the wake offset time is preset and wherein the maximum value for the wake offset time is preset.

There may be a wireless communication device that may include an interface and a processor wherein the wake offset time may be initially set to the maximum value. Wherein the number of beacons received may be counted, wherein the number of received beacons may exceed a preset value, wherein the value of wake offset may be reduced by a factor, wherein the reduced wake offset may be checked to ensure that it is not less than the minimum wake offset time, wherein the beacon count may be reset. Wherein the value of wake offset may be reduced by a fixed amount.

There may be a wireless communication device that may include an interface and a processor wherein a maximum time for the highest delay for a beacon is set.

There may be a wireless communication device that may include an interface and a processor wherein the processor may be arranged to calculate the difference between the actual time of arrival of a beacon and the predicted earliest time of arrival.

There may be a wireless communication device that may include an interface and a processor wherein the processor may be arranged to determine if the time difference between the actual time of arrival of a beacon and the predicted earliest time of arrival is greater than the maximum time for the highest delay.

There may be a wireless communication device that may include an interface and a processor wherein the processor may be arranged to determine if the time difference between the actual time of arrival of a beacon and the predicted earliest time of arrival is greater than the maximum time for the highest delay plus beacon period There may be a wireless communication device that may include an interface and a processor wherein the processor may be arranged to calculate the number of missed beacons There may be a wireless communication device that may include an interface and a processor wherein the processor may be arranged to determine if there have been any missed beacons, and if so to calculate the number of missed beacons: wherein any beacon count may be incremented by an amount corresponding to the number missed beacons, wherein a number of beacon periods, equal to the number of missed beacons may be added to the timing value for the received beacon, wherein the timing difference may be re-calculated to account for missed beacons by adding the number of beacon periods to the timing difference, wherein the value of wake offset may be increased by a factor, wherein the increased wake offset may be checked to ensure that it is not greater than the maximum wake offset time, wherein the value of wake offset maybe increased by a fixed amount There may be a wireless communication device that may include an interface and a processor wherein the processor may be arranged to record the minimum value of the timing difference over two sets of beacons; wherein the first set may comprise of a number of beacons, wherein the second set of beacons may comprise a similar number of beacons that are sent after the first set. Wherein the processor may be arranged to record the minimum value of the timing difference over each set of beacons, wherein the processor may be arranged to compare the minimum values of the timing difference for each set. Wherein if the value of minimum timing difference for the second set is higher than the first set, then the value of the minimum timing difference for the second set may be used as the minimum timing difference replacing the lower value determined during the first set of beacons.

The previously described methods used to predict the beacon timing have unnecessary complications. There is provided a method that involves estimating the next beacon time by summing the difference value, as shown in the table 1 below.

TABLE 1

| Beacon # | Actual TSF | Predicted TSF | Difference (Actual − predicted TSF) | Sum Difference |
|---|---|---|---|---|
| 0 | $T_0 + \Delta_o$ | | | |
| 1 | $T_1 = T_0 + T_b + \Delta_1$ | $T_0 + T_b + \Delta_o$ | $\Delta_1 - \Delta_o$ | $\Delta_1 - \Delta_o$ |
| 2 | $T_2 = T_0 + 2T_b + \Delta_2$ | $T_0 + 2T_b + \Delta_1$ | $\Delta_2 - \Delta_1$ | $\Delta_2 - \Delta_1 + (\Delta_1 - \Delta_o) = \Delta_2 - \Delta_o$ |

TABLE 1-continued

| Beacon # | Actual TSF | Predicted TSF | Difference (Actual − predicted TSF) | Sum Difference |
|---|---|---|---|---|
| 3 | $T_3 = To + 3Tb + \Delta_3$ | $To + 3Tb + \Delta_2$ | $\Delta_3 - \Delta_2$ | $\Delta_3 - \Delta_2 + (\Delta_2 - \Delta o) = \Delta_3 - \Delta o$ |
| n | $T_n = To + nTb + \Delta_n$ | $To + nTb + \Delta_{n-1}$ | $\Delta_n - \Delta_{n-1}$ | $\Delta_n - \Delta o$ |

The actual time for the initial beacon, beacon 0, is $To+\Delta o$, the predicted time of the next beacon is therefore $To+Tb+\Delta o$, the actual time for the next beacon, beacon 1, is $T_1=To+Tb+\Delta_1$, The difference between the actual time and the predicted time is difference=$(To+Tb+\Delta_1)-(To+\Delta o)=\Delta_1-\Delta o$.

Similarly the difference between the actual time and the predicted time of the next beacon, beacon 2, is difference=$\Delta_2-\Delta_1$ If we sum the differences for beacon 1 and beacon 2, then sum difference for beacon $2=\Delta_2-\Delta_1+\Delta_1-\Delta o=\Delta_2-\Delta o$ Similarly, the sum difference for the nth Beacon is $\Delta_n-\Delta o$ Note that this sum difference value is calculated for each beacon and updated on each successive beacon.

Over a period of time, the minimum value of $\Delta n-\Delta o$ can be determined and this is then assumed to represent the case when the beacon was on time and $\Delta n=0$. The beacon corresponding with the minimum value of the sum of the differences is assumed to be on time.

Hence, if the ith beacon was assessed to be on time, then the predicted time of the next beacon, (i+1)th beacon will be $Ti+Tb$, and similarly for the subsequent beacons. This method results in an accurate estimation of the actual beacon times but it is still necessary to store the time of the beacon that corresponded to the minimum value of the Sum Difference and then to keep an accurate count of the beacons after that. It is also necessary to account for any missed beacons by simply adding Tb to the predicted TSF if a beacon is missed.

The method may include replacing the predicted TSF value with an interim value IntTSF where IntTSFn=Actual TSF of the previous Beacon plus Tb minus the difference of the previous beacon and where difference=Actual TSF−IntTSF of the previous beacon.

Table 2 demonstrates:

TABLE 2

| Beacon # | Actual TSF | IntTSF | Difference (Actual TSF − IntTSF) |
|---|---|---|---|
| 0 | $To + \Delta o$ | | |
| 1 | $To + Tb + \Delta_1$ | $To + Tb + \Delta o$ | $\Delta_1 - \Delta o$ |
| 2 | $To + 2Tb + \Delta_2$ | $To + 2Tb + \Delta_1 - (\Delta_1 - \Delta o) = To + 2Tb + \Delta o$ | $\Delta_2 - \Delta o$ |
| 3 | $To + 3Tb + \Delta_3$ | $To + 3Tb + \Delta_2 - (\Delta_2 - \Delta o) = To + 3Tb + \Delta o$ | $\Delta_3 - \Delta o$ |
| n − 1 | $To + (n-1)Tb + \Delta_{n-1}$ | $To + (n-1)Tb + \Delta_{n-2} - (\Delta_{n-2} - \Delta o) = To + (n-1)Tb + \Delta o$ | $\Delta_{n-1} - \Delta o$ |
| n | $To + nTb + \Delta_n$ | $To + nTb + \Delta_{n-1} - (\Delta_{n-1} - \Delta o) = To + nTb + \Delta o$ | $\Delta_n - \Delta o$ |

As previously, for beacon 1 the actual TSF time is $To+Tb+\Delta_1$.

The value for IntTSF for beacon $1=To+\Delta o+Tb$ as the IntTSF for the initial beacon is zero.

The difference between actual TSF and IntTSF for beacon 1 is therefore $\Delta_1-\Delta o$ The actual TSF time for beacon $2=To+2Tb+\Delta_2$ The IntTSF for beacon 2 is the actual time of beacon 1 plus Tb minus the IntTSF for beacon 1:

$$IntTSF \text{ for beacon } 2 = To+Tb+\Delta_1+Tb-(\Delta_1-\Delta o) = To+2Tb+\Delta_0$$

And the difference between actual TSF and IntTSF for beacon 2 is therefore $\Delta_2-\Delta o$ Note that for the nth beacon the difference=$\Delta n-\Delta o$, and that for the nth beacon IntTSF=$To+nTb+\Delta o$.

If we assume that the ith beacon had zero delay, then $\Delta i=0$ and the difference=$-\Delta o$ then corresponds to the minimum difference value, Dmin. Hence, for every beacon, we simply add the existing minimum difference value, Dmin, to the IntTSF value for that beacon, and we have the time that the beacon should arrive. The TBTT for the nth beacon is then simply Tn=IntTSF+Dmin.

Note that IntTSF is dependent only upon the previous or last beacon hence the accurate predicted time of the next beacon is possible.

Note that if we record the maximum value of the difference then Dmax=$\Delta max-\Delta o$.

The value for $\Delta o$, is the minimum value Dmin, hence we can obtain the maximum beacon delay value as follows: Maximum beacon delay=Delay_max=Dmax−Dmin.

It is noted that Dmin is zero or negative.

This maximum delay value could be used as an indication of the quality of the network with respect to traffic and interference, for example.

Although the exact time has been estimated that the next beacon should be transmitted, it is still advisable that the STA wake up a short time ahead of the predicted time in order to account for various timing errors.

WakeOffset is defined as the time that the STA wakes ahead of the predicted earliest time for the next beacon.

The minimum value for WakeOffset, WakeOffsetMin, will account for possible timing errors and for any implementation specific timings that may be present. The initial starting or maximum value, WakeOffsetMax is a relatively large value because for the reception of the first set of beacons the delays are completely unknown.

The basic objective is that the value for WakeOffset will start at the maximum value and gradually decrease in value as confidence in the estimation of Dmin rises, until WakeOffset is at its minimum value.

One method to achieve this is by counting the number of successive beacons that are successfully received and if the number reaches a preset number, say 10 successfully received successive beacons, the value for WakeOffset can be reduced in any manner (for example—in an exponential or linearly manner), subject to the minimum value, WakeOffsetMin.

If, however, it is determined that one or more beacons have been missed, then the WakeOffset value can be increased in any manner and preferably immediately (for example exponentially or linearly), subject to the maximum value, WakeOffsetMax.

The value for WakeOffsetMin can be calculated based upon the maximum allowable time drift between the AP and the STA, or could be derived by measuring the actual time drift over long periods.

The time drift is related to the beacon period, the longer the time between beacons the higher the required value for WakeOffsetMin. WakeOffsetMin must also account for the time that the STA requires to successfully bring itself out of sleep mode.
Combining the determination of Dmin and WakeOffset, the time for the STA to wake up for the next beacon is therefore:
WakeUpTime=IntTSF+Dmin−WakeOffset.
Note that Dmin is zero or negative The timing of the beacon transmissions may be subjected to an unpredictable shift or offset in time and it is desirable to account for this possibility.

If the beacon timing was subjected to a negative time shift, the beacons would start to be transmitted early and then it is possible that beacons will be missed by the STA as it will be waking up too late.

In this case WakeOffset will be automatically increased such that the beacons are received. In this case, the Dmin value will also automatically adjust, becoming more negative and hence the beacon prediction time is again accurate. If the beacon timing is subjected to a positive time shift then the STA would be waking up earlier than it need. In this case the value for Dmin will be incorrect as it will be based upon the previous times before the beacon timing shift occurred. In this case, a new value for Dmin should be established. By monitoring the value for Dmin over set periods, it is possible to recognize when a shift in beacon timing has occurred. For example, assume that Dmin is calculated for every 100 beacons. For the first 100 beacons, assume that Dmin=−A, and then for beacons 101 to 200, assume that Dmin=−B. If A is less than B then this is interpreted as a positive shift in the beacon timing and Dmin is reset to the value −A. This then accounts and adjusts for positive time shift in the beacon timing. Note that if at any time Dmin for beacons 101 to 200 is less negative than −A, then Dmin is set to that lesser value immediately. This automatically accounts for a negative time shift in the beacon timing.

The number of beacons used to determine if a positive shift has occurred can vary. If it is too large, then the time that the STA is waking up too early is longer, if it is too short then there is a chance that a beacon with zero delay was not sent. An alternative is to use a period of time rather than a fixed number of beacons.

There may be provided a scheme that accurately estimates the earliest time that a beacon can be transmitted and wakes up an IEEE 802.11 STA at the latest possible time to receive that beacon, thus conserving power but maintaining a high probability that the beacon is received. This scheme is suitable for situations where the beacon is subjected to significant delays and also shifts in timing.

Figure 2:
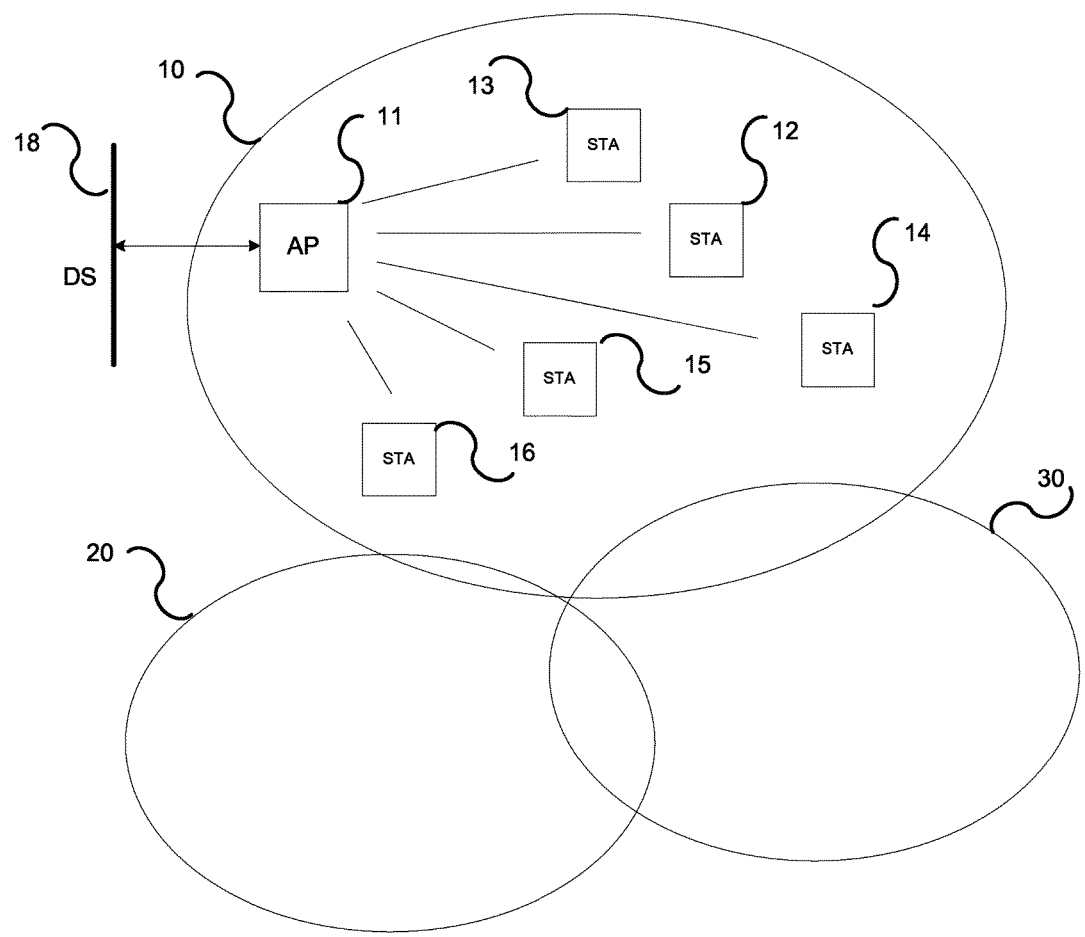
FIG. 2 is a schematic diagram of a representation of an IEEE 802.11 network with a plurality of stations and surrounded by other networks.

FIG. 2 is a schematic diagram of a typical IEEE 802.11 infrastructure network 10 operating in a busy environment.

The network 10 includes an access point AP 11 and a number of stations, STAs, 12, 13, 14, 15 and 16.

Station STA 12 is associated to the AP 11 which, in turn is connected to distribution system DS 18.

A number of other STAs 13, 14, 15 and 16 in the same network are also associated to AP 11. STAs 13, 14, 15, and 16 are a representation of a number of STAs that may be associated to AP 10 and are shown so as to represent a plethora of STAs such that the traffic load in network 10 is high. Two other networks 20 and 30 are in the vicinity of network 10.

Each of these networks, 20 and 30 consists of an AP and a plethora of STAs. The locations of and the frequencies used in Networks 20 and 30 are such that they will cause interference to network 10. Such a combination of the traffic and the interference may cause the beacon timing for AP 11 to jitter.

Figure 3:
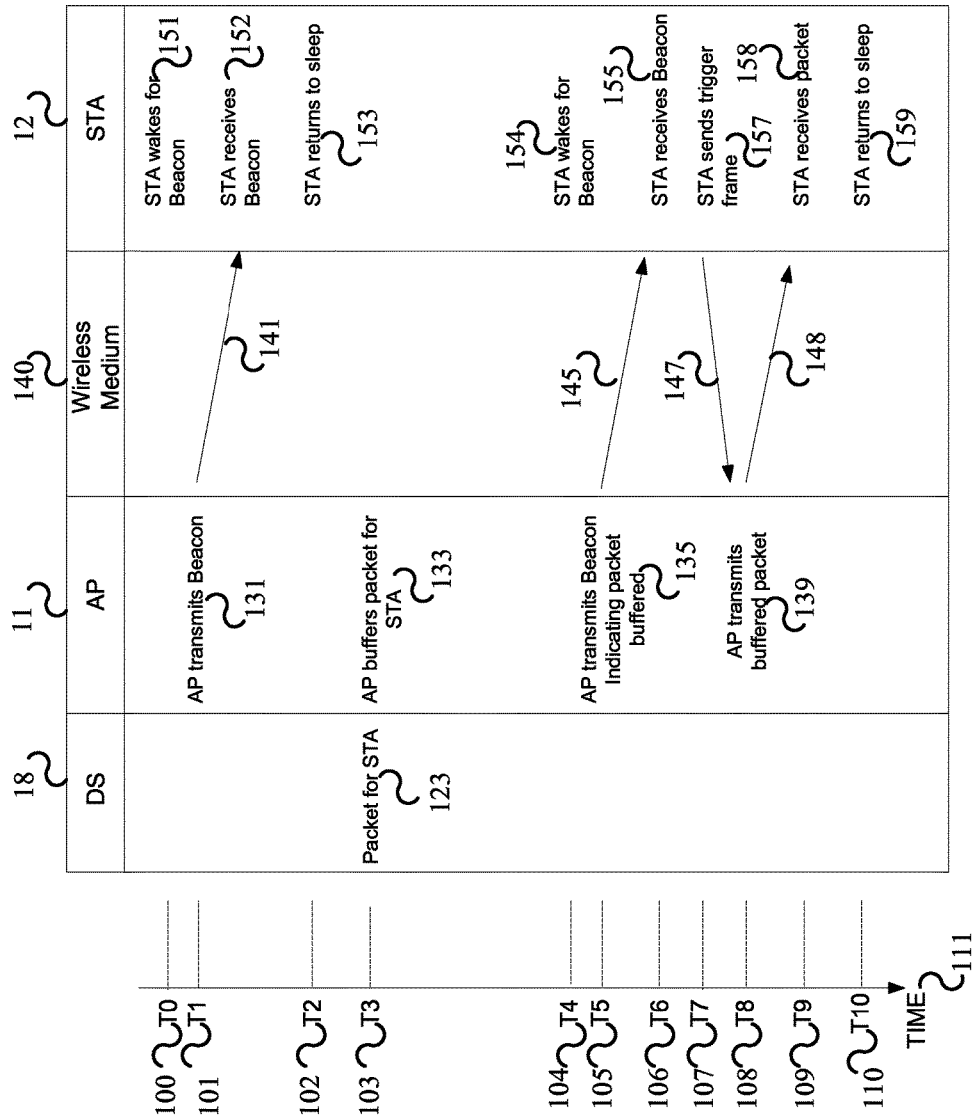
FIG. 3 is a timeline diagram indicating beacon transmissions.

FIG. 3 is a timeline diagram, time axis 111, which shows the actions of AP 10 and STA 12 when STA 12 is in power save mode.

Following IEEE802.11 standard procedures, AP 11 will buffer any packets for STA 12 and then will indicate in its beacon transmissions if there are packets for STA 12.

At time T0 100, STA 12 wakes up, 151. At time T1, 101, AP 11 transmits a beacon, 131. The beacon is transmitted 141 over the wireless medium 140 to STA 12. STA 12 receives the beacon 152. In this case the beacon 141 indicates that there are no packets buffered for STA 12, and hence, at time T2 102, STA 12 will return to its sleep mode 153.

At time T3, 103, AP 11 receives a packet, 123, from the DS 18, that is addressed to STA 12. AP 11 buffers the packet 133 as AP 11 is aware that STA 12 is sleeping. At time T4, 104, STA 12 again wakes 154 in order to receive the next beacon from AP 11. At time T5, 105, STA 12 will wake up to listen to beacons being transmitted by AP 11 in order to detect if there are any packets intended for delivery to it. There are certain procedures that determine the various actions that STA 12 can use to retrieve buffered packets, but these are not of concern in this invention.

STA 12 can indicate to the AP 11 a "Listening Period" which informs the AP how many beacon periods it will sleep for.

AP 11 will attempt to transmit beacons at a regular time interval, Tb, known as Target Beacon Transmission time (TBTT). The AP advertises the ideal duration between beacons. If the network is loaded, or subject to interference from other possibly overlapping or networks on adjacent channels 15, or if the AP has other tasks, then the beacon transmissions can be subject to significant unknown delay and jitter.

STA 12 needs to predict when the next beacon is due to be transmitted as waking up too early will waste power and waking up too late will mean that the beacon could be missed. The basic objective is to determine the correct TBTT, to have a high probability of receiving the beacon, but to be active for the shortest possible time.

Figure 4:
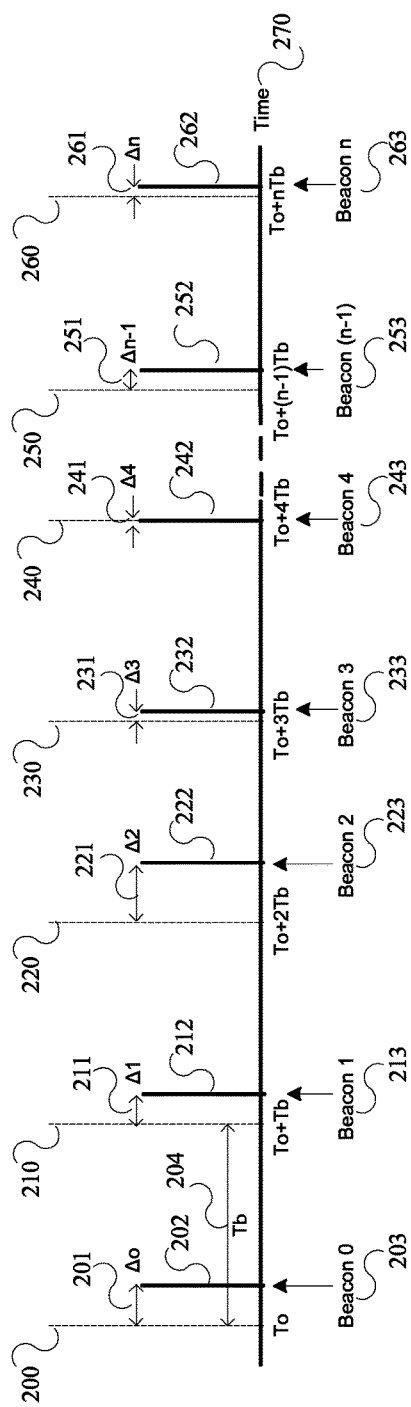
FIG. 4 is a timeline diagram of beacon transmissions with jitter.

FIG. 4 is a timeline 270 showing the times 200, 210 220 230 240 250 and 260 when beacons 203, 213, 223, 233, 243 253 and 263 respectively would ideally be transmitted by AP 11 in FIGS. 2 and 3. The ideal transmission times are spaced at intervals of Tb 204. The actual times of the beacon transmissions are 202, 212, 222, 232, 242, 252 and 262 and are shown assuming that there was a jittering of the beacon transmission times 201, 211, 221, 231, 241, 251 and 261 respectively. The first beacon, Beacon 0, 203, is transmitted at a time 201 which is a delay of Δo, 202, after the ideal time To, 200. Similarly the delay of the nth beacon 263, is Δn 261.

Hence the actual transmission time of the nth beacon is To+nTb+Δn. STA 12 in FIGS. 2 and 3 maintains a copy of the TSF (timing synchronization function) which is a local timer that is synchronized to the timing of the AP 11. 'Actual TSF' is the time that a beacon was received, and 'Predicted TSF' is the 'Actual TSF' of the previous beacon plus Tb. Hence, for the nth beacon:

$$\text{Predicted } TSFn = To + (n-1)Tb + \Delta n - 1 + Tb = To + nTb + \Delta n - 1$$

A value IntTSF for the nth beacon is defined where: IntTSFn=Actual TSF of the previous Beacon plus Tb minus the "Difference" of the previous beacon=To+(n−1)Tb+Δn−1—Difference, and Difference=Actual TSF−IntTSF(n−1)

The following table demonstrates the values and calculations for IntTSF and Difference:

| Beacon # | Actual TSF | IntTSF | Difference (Actual TSF − IntTSF) |
|---|---|---|---|
| 0 | $To + \Delta_0$ | | |
| 1 | $To + Tb + \Delta_1$ | $To + Tb + \Delta_0$ | $\Delta_1 - \Delta_0$ |
| 2 | $To + 2Tb + \Delta_2$ | $To + 2Tb + \Delta_1 - (\Delta_1 - \Delta_0) = To + 2Tb + \Delta_0$ | $\Delta_2 - \Delta_0$ |
| 3 | $To + 3Tb + \Delta_3$ | $To + 3Tb + \Delta_2 - (\Delta_2 - \Delta_0) = To + 3Tb + \Delta_0$ | $\Delta_3 - \Delta_0$ |
| n − 1 | $To + (n-1)Tb + \Delta_{n-1}$ | $To + (n-1)Tb + \Delta_{n-2} - (\Delta_{n-2} - \Delta_0) = To + (n-1)Tb + \Delta_0$ | $\Delta_{n-1} - \Delta_0$ |
| n | $To + nTb + \Delta_n$ | $To + nTb + \Delta_{n-1} - (\Delta_{n-1} - \Delta_0) = To + nTb + \Delta_0$ | $\Delta_n - \Delta_0$ |

Note
that for the nth beacon, Difference = $\Delta n - \Delta_0$ and IntTSF = $To + nTb + \Delta_0$ If the nth beacon had zero delay, Δn=0, then Difference=−Δo which is the minimum value Difference could take. Therefore by determining the minimum value of Difference over a series of beacons, the value of Δo is known and can be subtracted from the value of IntTSF to result in the ideal time of the beacon, To+nTb.

FIG. 6 is a flowchart of a method according to an embodiment of the invention for determining the ideal beacon transmission times and to set the wake up time.

The fixed parameters used in the flowchart FIG. 6 are:

MaxDelay: value of highest delay for a beacon. If a beacon is measured with a delay greater than MaxDelay, then it is assumed that there was a missed beacon in between. If a beacon has not been received before the time MaxDelay has elapsed after the predicted time of the beacon, then the STA can go back into sleep mode.

BeaconPeriod: nominal time between beacons. Note that if the STA wakes up for every beacon then this is the same as the AP advertised beacon period. If the STA wakes up for every other beacon or every third beacon, for examples, then this value is two or three times the beacon period advertised by the AP, respectively.

WakeOffsetMax: Maximum value of WakeOffset. WakeOffset is the time used to wake up the STA before the predicted time of the next Beacon.

WakeOffsetMin: Minimum value of WakeOffset.

BeaconSuccessCount: Fixed value of successive successful Beacons received, used to reduce the value of WakeOffset.

BeaconSuperCountMax: Fixed value of number of received beacons over which MinDifferenceA is determined.

The variable parameters used in the flowchart are:

NewTSF: TSF of the latest received Beacon

PreviousTSF: TSF of the previous Beacon

IntTSF: TSF value based upon previous TSF, BeaconPeriod and PreviousDifference

NewDifference: Difference between IntTSF and New TSF for the latest Beacon

PreviousDifference: Difference between IntTSF and NewTSF for the previous Beacon MinDifference: the minimum value of NewDifference.

MinDifferenceA: the minimum value of NewDifference for the present set of Beacons confined by BeaconSuperCount MinDifferenceB: the minimum value of NewDifference for the previous set of Beacons confined by BeaconSuperCount WakeOffset: Advance Time used to wake up STA to receive Beacon BeaconCount: counter for the Beacons used to see if BeaconSuccessCount has been reached.

BeaconSuperCount: counter for number of beacons received used to see if

BeaconSuperCountMax has been reached

MissBeacon: the number of consecutive missed Beacons

WakeUp: the time to Wake for the next beacon

Figure 5:
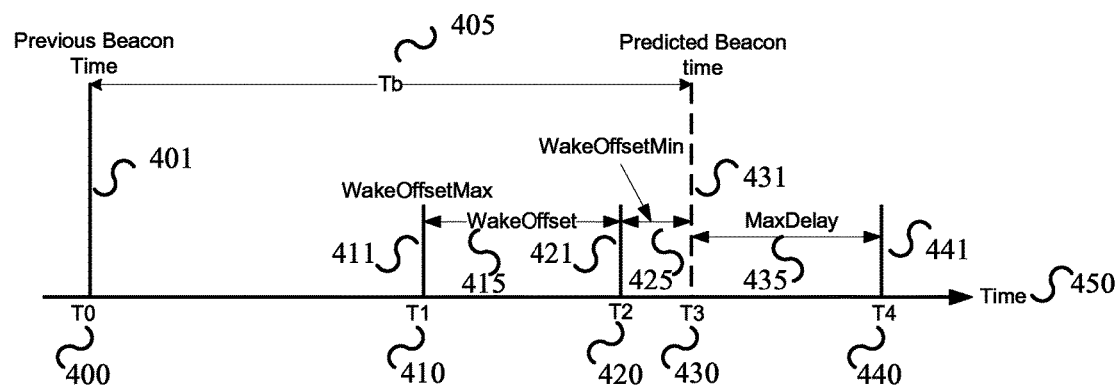
FIG. 5 is a timeline diagram illustrating various parameters used in the flowchart FIG. 6.

To aid in understanding the parameters used in FIG. 6, FIG. 5 is a timeline 450 that illustrates the parameters that are used to wake up the STA and set it back in sleep mode. At time T0, 400, the previous beacon 401 was transmitted.

The predicted time T3 430 of the next beacon 431 is the transmission time 400 of the previous beacon 401 plus the nominal time between beacons Tb 405. WakeOffset 415 plus WakeOffsetMin 425 is the time that the STA wakes up in advance of the predicted time 430 of the next beacon 431. Initially the STA has no information therefore the initial value of WakeOffset 415 is a relatively large value, WakeOffsetMax 411, which would cause the STA to wake up at time T1, 410 because for the reception of the first set of Beacons, the delays are completely unknown.

If a set number of successive beacons are successfully received, BeaconCountSuccess, then the WakeOffset 415 value can be reduced from WakeOffsetMax 411.

As more Beacons are received successfully, then the WakeOffset 415 value can be further reduced towards a minimum value WakeOffsetMin 425. Hence, the WakeOffset 415 value can be reduced at a certain rate towards a minimum value, WakeOffsetMin 425, as long as beacons are being received, then, if a Beacon is missed, the value is increased. For example, as will be explained further in FIG. 5, if the number of successive beacons successfully received is counted, BeaconCount, and if the value of BeaconCount reaches a preset value BeaconCountSuccess, the value for WakeOffset 415 is exponentially reduced, subject to the minimum value, WakeOffsetMin 425 and the BeaconCount reset to zero.

If it is determined that one or more beacons have been missed, then the WakeOffset 415 value is increased immediately, exponentially, subject to the maximum value, WakeOffsetMax 411. It should be noted that this scheme can be used independently to wake the STA.

The value for WakeOffsetMin 425 can be calculated based upon the maximum allowable time drift between the AP and the STA, or could be derived by measuring the actual time drift over long periods. The time drift is related to the beacon period, the longer the time between beacons the higher the required value for WakeOffsetMin 425. WakeOffsetMin 425 must also account for the time that the STA requires to successfully bring itself out of sleep mode.

FIG. 5 also illustrates the relative timing for MaxDelay 445. In the case that the beacon did not arrive when predicted, T3 430, a value for the time T4, 440, after the predicted beacon time T3 is set so that the STA can go back to sleep. This time delay is termed MaxDelay. Also, if the time measured between two received beacons is greater than MaxDelay then this is an indication that one or more beacons have been missed.

Figure 6A:
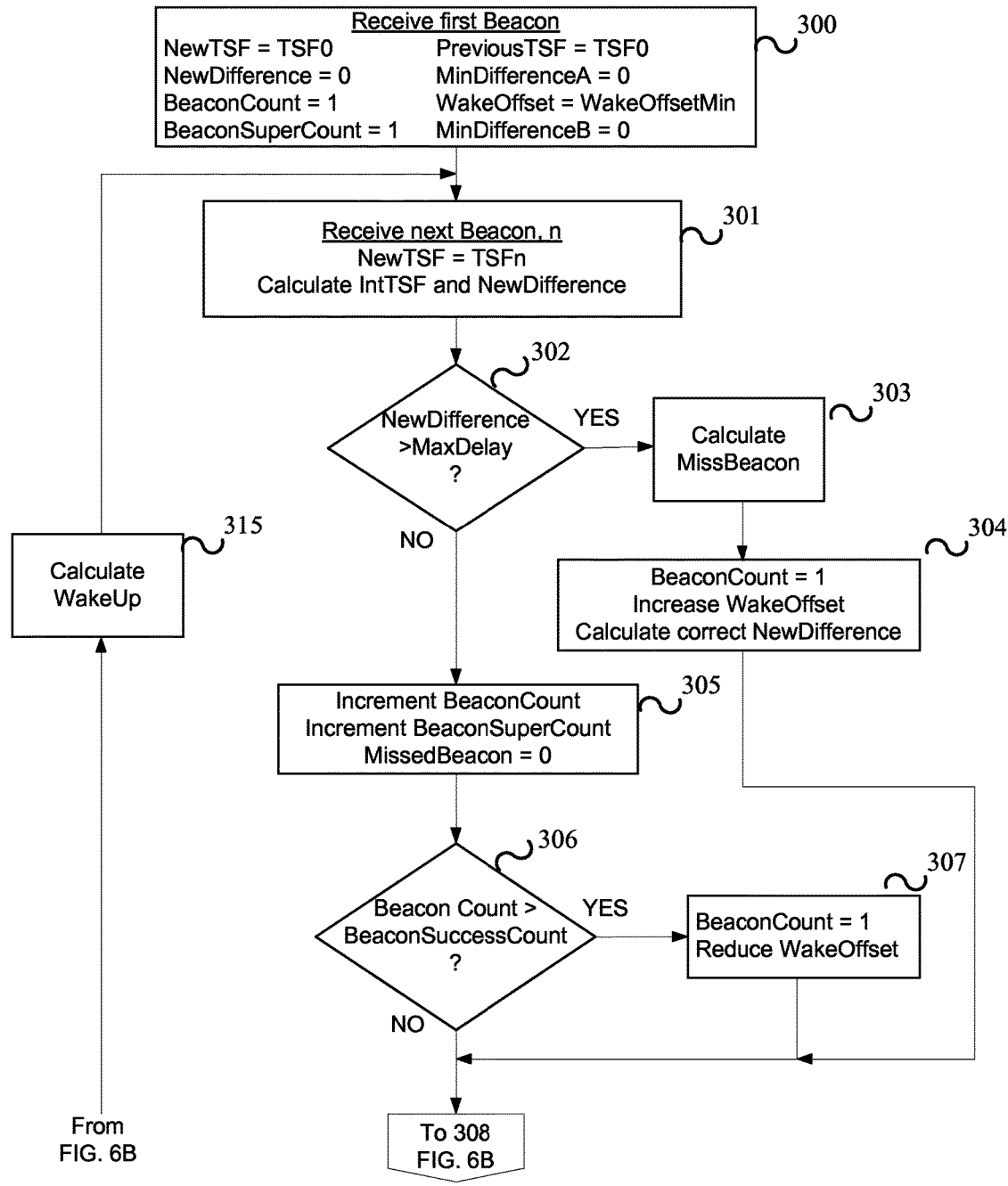
FIG. 6A and FIG. 6B are flowcharts of the beacon timing prediction scheme according to an embodiment of the invention and the setting of the wake time.
Figure 6B:
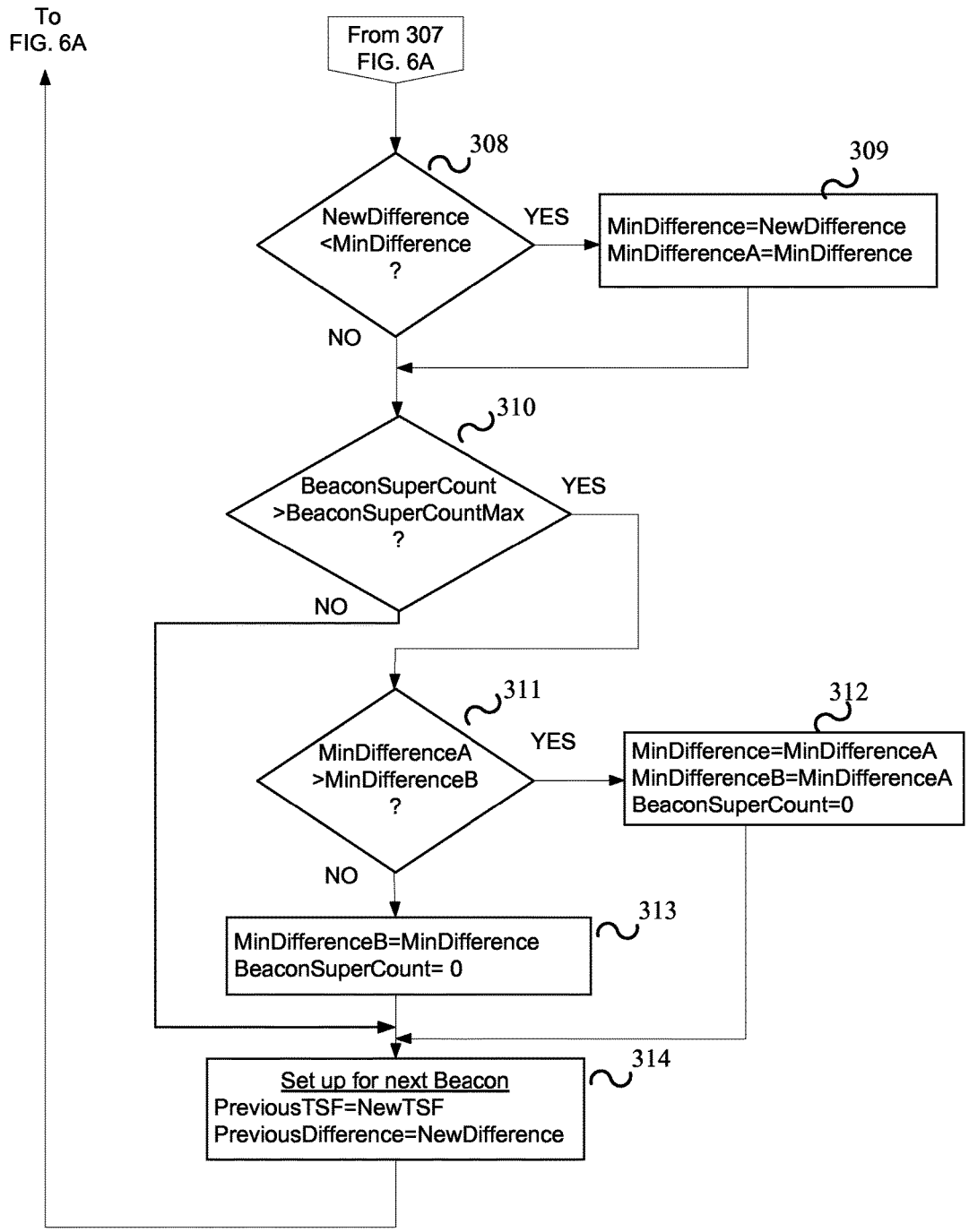

FIGS. 6A and 6B illustrate a flowchart of an embodiment for a STA, to determine the ideal beacon transmission times and to set the wake up time.

At step 300, the first beacon is received and this is used to set the initial values of the following parameters: NewTSF=TSF0, PreviousDifference=0, PreviousTSF=TSF0. In addition the following initial values of the following parameters are set: NewDifference=0, MinDifferenceA=0, MinDifferenceB=0, BeaconCount=1, BeaconSuperCount=1, WakeOffset=WakeOffsetMax.

For each subsequent beacon, in step 301, first the NewTSF is obtained from the TSF of the received beacon, and then the values for IntTSF and NewDifference are calculated.

$$NewTSF = TSFn$$

$$IntTSF = TSF(n-1) + BeaconPeriod - PreviousDifference$$

$$NewDifference = TSFn - IntTSF$$

Step 302 checks if one or more beacons have been missed. If so, the number of missed beacons is calculated in step 303.

In step 304 the BeaconCount is reset to 1 and the WakeOffset value is increased. The corrected value for NewDifferenceA is then calculated:

$$NewDifference = NewDifference - (MissBeacon \times BeaconPeriod)$$

If, in step 302, it is determined that beacon has been received successfully then in step 305 the BeaconCount and the BeaconSuperCount are both incremented. In step 306 a check is made to determine if the required number of successful successive beacons for the reduction of the WakeOffset value has been received, and if so, in step 307, the value for WakeOffset is reduced.

Step 308 checks if the value of NewDifference is less than the minimum difference, MinDifference. If it is then in step 309 MinDifference takes the value of NewDifference and MinDifferenceA then takes on the value of MinDifference.

In step 310 it is checked if the BeaconSuperCount is greater than the maximum value, BeaconSuperCountMax. If so, then in step 311 a check is made to see if MinDifferenceA, the minimum Difference value measured over the last set of beacons, is greater than MinDifferenceB, the minimum Difference value measured over the previous set of beacons.

If it is greater, then this indicates that the beacon timing was subject to a positive shift and hence, in step 312 the value for MinDifferenceA is used for MinDifference. MinDifferenceB is set to the value of MinDifferenceA and the BeaconSuperCount reset to zero.

Alternatively, if, in step 311 it is determined that MinDifferenceA is not greater than MinDifferenceB, then in step 313 MinDifferenceB is set to the value of MinDifference and the BeaconSuperCount reset to zero.

At the conclusions of steps 312 or 313 or if in step 310 it is determined that the BeaconSuperCount is not greater than the maximum value, BeaconSuperCountMax, then the next step is 314. In step 314 the conditions are set up for the next beacon. The PreviousTSF becomes the NewTSF and the PreviousDifference becomes the NewDifference. In step 315 the time to wake up for the next beacon is set by calculating the WakeUp value:

$$WakeUp = IntTSF + MinDifference - WakeOffset$$

At this point the STA can go back to sleep.

Figure 7:
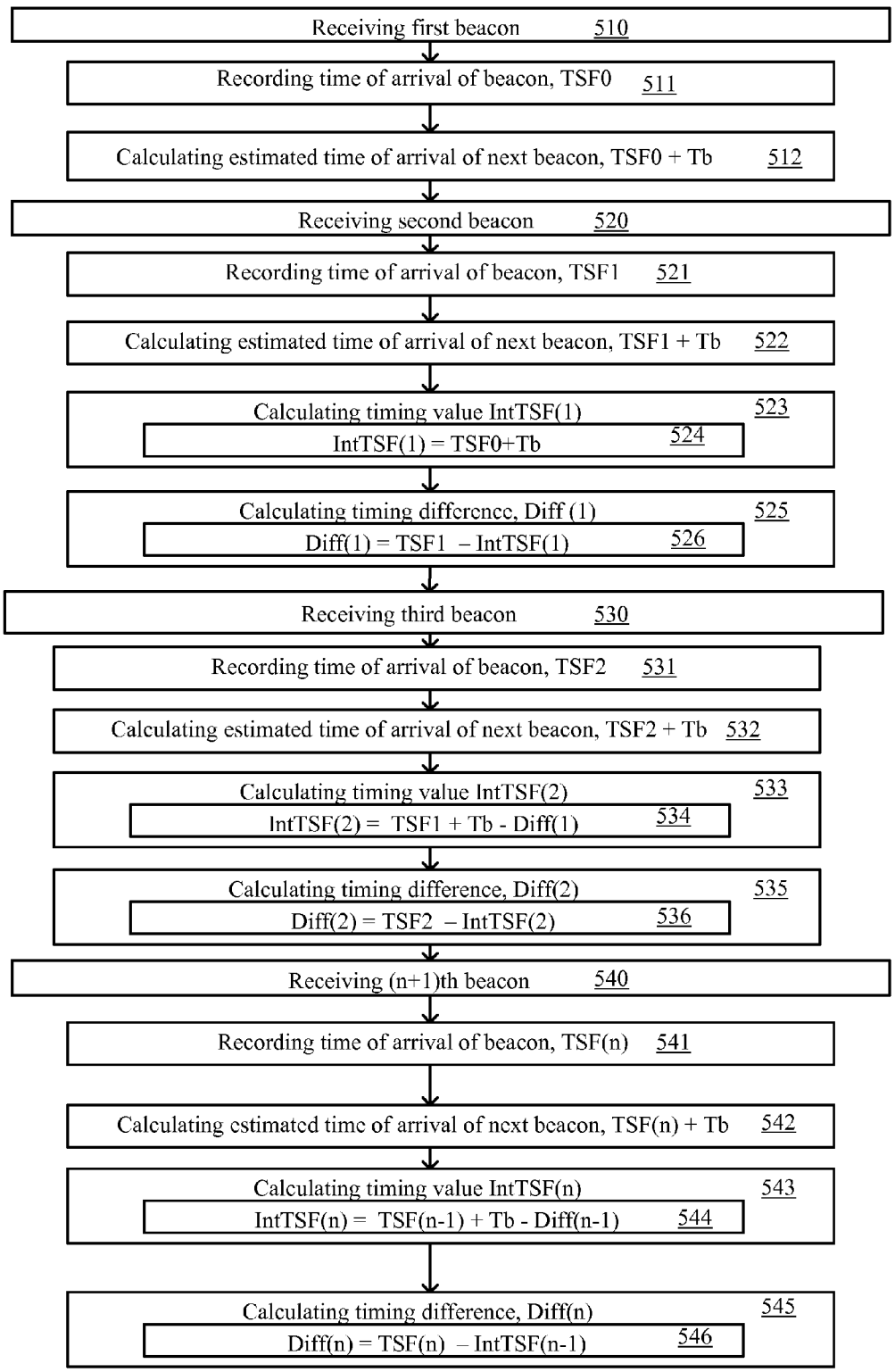
FIG. 7 is an illustration of a method according to an embodiment of the invention to calculate the timing differences.

FIG. 7 illustrates method 500 according to an embodiment of the invention.

Method 500 may start by receiving the first beacon 510. This may be the first beacon of a set of beacons, or the first beacon that the STA receives. Stage 510 may be followed by stage 511 and 512. The time of arrival for that first beacon may be recorded in stage 511. The estimated time of arrival of the next beacon may be calculated in stage 512. The estimated time of arrival of the next beacon may be the time of arrival of this beacon, TSF0, plus the beacon period, Tb.

Stage 512 may be followed by stage 520 where the second beacon is received. Stage 520 may be followed by stages 521, 522, 523 and 525.

In stage 521 the time of arrival, TSF1, of this second beacon may be recorded.

Stage 521 may be followed by stage 522 where the estimated time of arrival of the next, third beacon, may be calculated. The estimated time of arrival of the next, the third beacon, is the time of arrival of this second beacon, TSF1, plus the beacon period, Tb.

Stage 522 may be followed by stage 523 where a timing value for this second beacon, IntTSF(1), may be calculated. This timing value may be the sum of the time of arrival of the first beacon, TSF0, and the beacon period, Tb, as illustrated by stage 524.

Stage 523 may be followed by stage 525 where a timing difference for this beacon, Diff(1), may be calculated. This timing difference, Diff(1), may be the difference between the time of arrival of this beacon, TSF1, and the timing value, IntTSF(1) as illustrated by stage 526.

Stage 525 may be followed by stage 530 where the third beacon is received.

Stage 530 may be followed by stages 531, 532, 533 and 535.

In stage 531 the time of arrival, TSF2, of this third beacon may be recorded.

Stage 531 may be followed by stage 532 where the estimated time of arrival of the next, third beacon may be calculated. The estimated time of arrival of the next beacon, is the time of arrival of this second beacon, TSF2, plus the beacon period, Tb.

Stage 532 may be followed by stage 533 where a timing value, IntTSF(2), for this second beacon may be calculated. This timing value, IntTSF(2) may be the sum of the time of arrival of the previous beacon, TSF1, and the beacon period, Tb, minus the timing difference, Diff(1) of the previous beacon, as illustrated in stage 534.

Stage 533 may be followed by stage 535 where a timing difference for this beacon, Diff(2), may be calculated. This timing difference, Diff(2), may be the difference between the time of arrival of this beacon, TSF2, and the timing value, IntTSF(2)—as illustrated in stage 536.

Stage 534 may be followed by stage 540 where the (n+1)th beacon is received. Stage 540 may be followed by stages 541, 542, 543 and 545.

In stage 541 the time of arrival, TSF(n), of the (n+1)th beacon may be recorded.

Stage 541 may be followed by stage 542 where the estimated time of arrival of the next, the (n+2)th beacon may be calculated. The estimated time of arrival of the (n+2)th beacon, is the time of arrival of this (n+1)th beacon, TSF(n), plus the beacon period, Tb.

Stage 542 may be followed by stage 543 where a timing value, IntTSF(n), for this (n+1)th beacon may be calculated.

This timing value, IntTSF(n) may be the sum of the time of arrival of the previous beacon, TSF(n−1), and the beacon period, Tb, minus the timing difference, Diff(n−1) of the previous beacon, as illustrated by stage 544.

Stage 543 may be followed by stage 545 where a timing difference for this beacon, Diff(n), may be calculated. This timing difference, Diff(n), may be the difference between the time of arrival of this beacon, TSF(n)2, and the timing value, IntTSF(n) as illustrated by stage 546.

Figure 8:
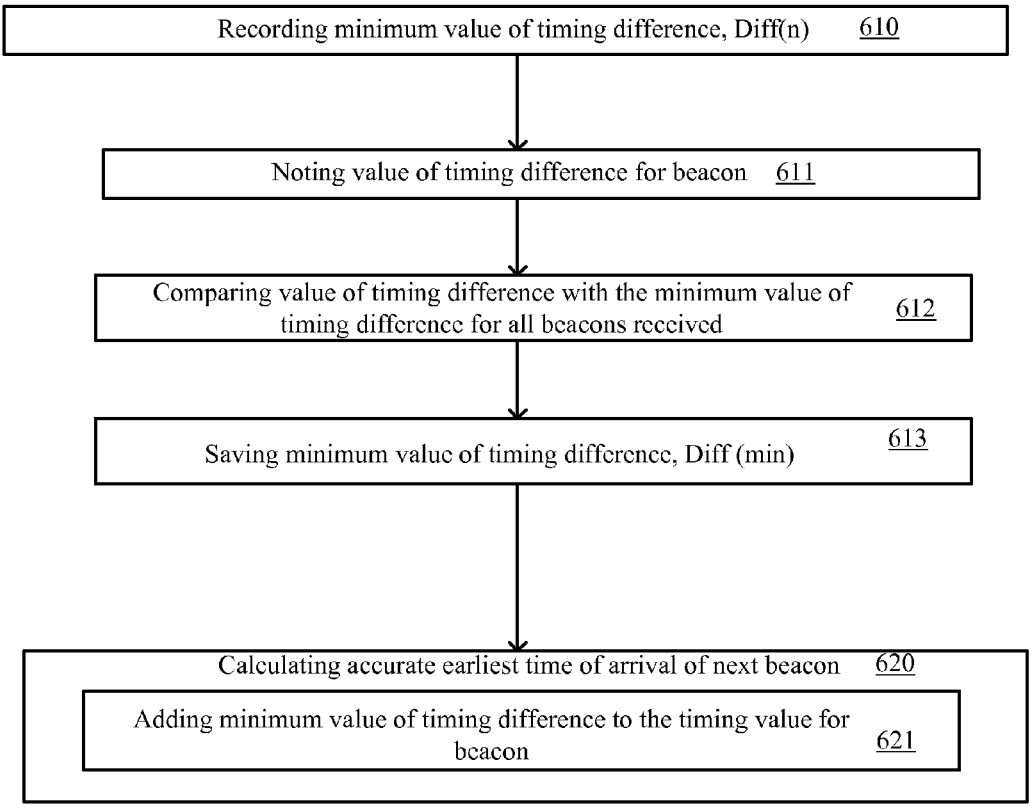
FIG. 8 is an illustration of a method according to an embodiment of the invention to calculate the accurate time of arrival of next beacon.

FIG. 8 illustrates method 600 according to an embodiment of the invention which calculates the accurate earliest time of arrival of the next beacon.

Method 600 may follow method 500. The method 600 may begin with stage 610, which may record the minimum value of the timing differences as each beacon is received and may be processed as described in method 500, FIG. 8.

Stage 610 may be followed by stages 611, 612 and 613.

Stage 611 may note and record the timing difference for each beacon.

Stage 612 may compare the timing differences so as to determine and record the minimum value to date. The value of the minimum timing difference, Diff(min) to date may then be saved in stage 613.

Stage 613 may be followed by stage 620 which may calculate the accurate time of arrival of the next beacon. Stage 620 may include stage 621.

The calculation of the accurate time of arrival of the (n+1)th beacon may be calculated in stage 621 by adding the minimum value of the timing difference, Diff(min), to the timing value of the (n+1)th beacon, IntTSF(n).

The minimum value of the timing difference represents the timing delay in the first received beacon and hence when added to the timing value of a beacon this initial delay is removed and the correct initial timing for the beacons is established. As the number of received beacons increases the probability that a beacon is received at the correct time, i.e. with no delay, increases. When a beacon is received at the correct time, the minimum timing difference will be exactly the delay in the first received beacon and hence the correct timing of all beacons will be known. Subsequent beacons may experience delays, but the earliest time that the beacon may be transmitted is now known.

Figure 9:
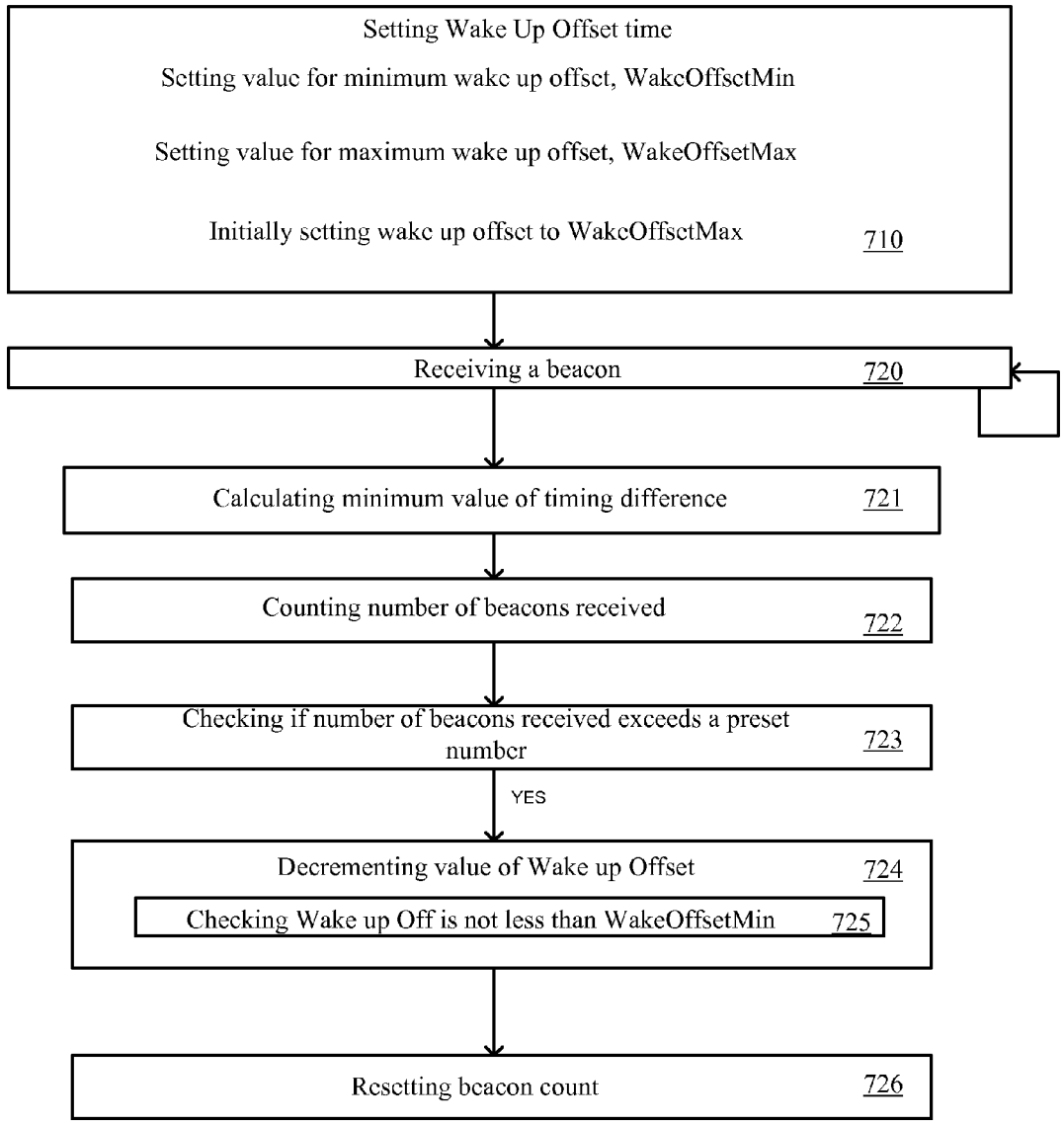
FIG. 9 is an illustration of a method according to an embodiment of the invention to set the wake up timing.

FIG. 9 illustrates method 700 according to an embodiment of the invention which may set the timing of wake up for the STA.

Although method 700 may have calculated and predicted the exact earliest time that the next beacon should be transmitted, it may still be advisable that the STA wakes up a short time ahead of the predicted time in order to account for various timing errors.

Method 700 may start by initialization stage 710 that may include:
a) Setting a WakeOffset (the time that the STA wakes ahead of the predicted earliest time for the next beacon).
b) Setting a minimum value for WakeOffset (WakeOffsetMin) that may account for possible timing errors and for any implementation specific timings that may be present setting
c) Setting a maximum value, WakeOffsetMax that may be a relatively large value because for the reception of the first set of beacons the delays may be completely unknown. The basic objective of method 700 may be that the value for WakeOffset may start at the maximum value.
d) And initially setting the WakeOffset to WakeOffsetMax.

Stage 720 may follow stage 710 and may include receiving a beacon.

As each beacon is received the minimum value of the timing difference may be calculated in stage 721. Method 600 of FIG. 8 may be used to calculate the minimum timing difference.

Stage 722 may count the number of received beacons.

In stage 723 the number of received beacons may be compared to a preset number.

If, in stage 723, the number of received beacons exceeds the preset number, then stage 723 may be followed by stage 724 where the value of the WakeOffset may be decremented by an amount. This amount may be a fixed preset time period or by a factor. For example the value for WakeOffset may be reduced by a factor of 2 each time the beacon count exceeds the preset beacon count.

Stage 724 may be followed by stage 725 where the value of the WakeOffset is checked to ensure that it is not less than WakeOffsetMin, which represents the minimum value that WakeOffset may be set to.

Stage 724 may be followed by stage 726 where if the beacon count has exceeded the preset number, then the beacon count is reset.

Figure 10:
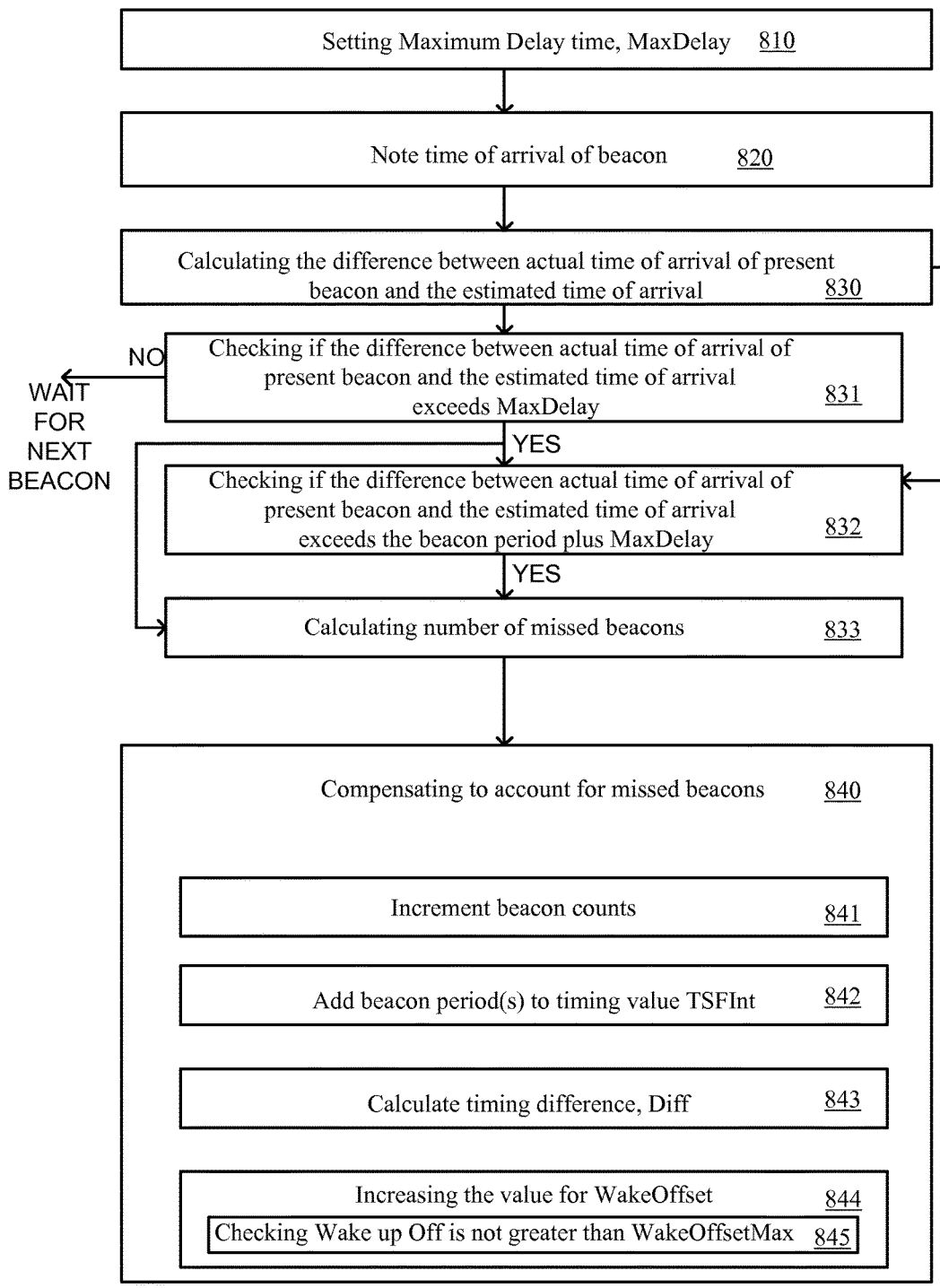
FIG. 10 is an illustration of a method according to an embodiment of the invention to note and compensate for a missed beacon.

FIG. 10 illustrates method 800 according to an embodiment of the invention which accounts for the situation when a beacon is missed.

The method to account for a missed beacon may start with stage 810 which sets a maximum delay time. Maximum delay time, MaxDelay, may be the timing for the highest delay for a beacon.

If the arrival time difference between beacons is measured as greater than MaxDelay, then it may be assumed that there was a missed beacon. If a beacon has not been received before the time MaxDelay has elapsed after the predicted time of the beacon, then the STA may go back into sleep mode.

Stage 820 may follow stage 810.

Stage 820 may note the time of arrival of each beacon.

Stage 830 may follow stage 820.

Stage 830 may calculate the difference between the actual time of arrival of the beacon and the estimated time of arrival which may have been calculated in method 500, FIG. 7.

Stages 831 and 832 may follow stage 830.

Stage 831 may check if the time difference calculated in stage 830 exceeds the maximum delay value set in stage 810.

In stage 832 the time difference between the time of arrival of the present beacon and the estimated time of arrival may be checked to determine if it exceeds the maximum delay, MaxDelay, plus the beacon period, Tb.

In the case that the estimated time of arrival does exceeds the maximum delay, MaxDelay, plus the beacon period, Tb, stage 832 may be followed by stage 833.

Stage 833 may calculate the number of missed beacons by comparing the time difference between the time of arrival of the beacon and the estimated time of arrival to the beacon period, Tb.

If in stage 831 or in stage 832 it is determined that the time difference is greater than the maximum delay, then method 800 proceeds to stage 840.

Stage 840 may compensate for missed beacon(s).

Stage 840 may include stags 841, 842, 843 and 844.

Stage 841 may increment any beacon count, so as to account for the missed beacon. If in stage 833 it was determined that more than one beacon was missed, then the beacon counts in stage 841 are incremented accordingly.

Stage 842 may add one or more beacon periods, Tb, to the timing value for the received beacon to compensate for the number of missed beacons as may be determined in stage 833.

Stage 843 may re-calculate the timing difference to account for missed beacons by adding the number of beacon periods to the timing difference, TSFInt, corresponding to the number of missed beacons as may be determined by stage 833.

Stage 844 may increase the value for WakeOffset. This amount may be a fixed preset time period or by a factor. For example the value for WakeOffset may be increased by a factor of 2 each time it is determined in method 800 that a beacon has been missed. Stage 844 may be followed by stage 845.

Stage 845 checks and ensures that the value for WakeOffset is not greater than WakeOffsetMax.

Figure 11:
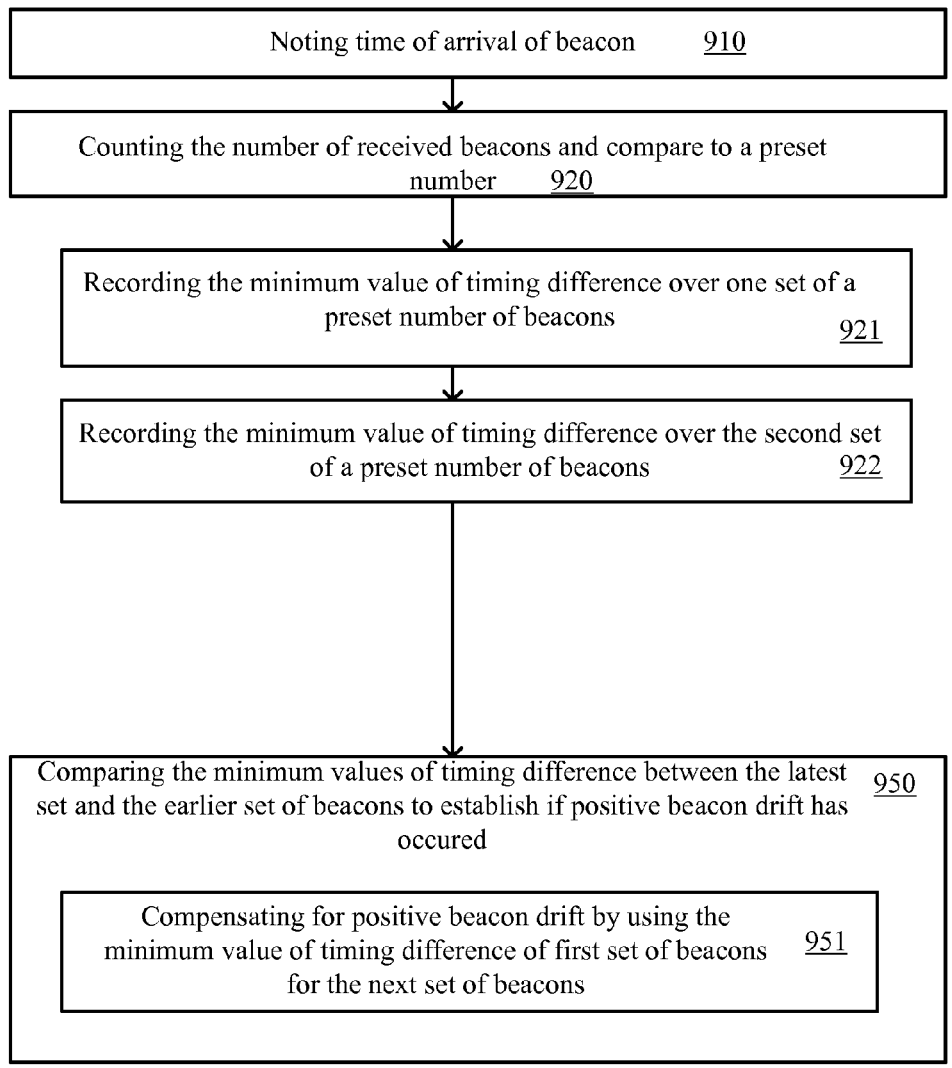
FIG. 11 is an illustration of a method according to an embodiment of the invention to determine and compensate for a positive beacon drift.

FIG. 11 illustrates method 900 according to an embodiment of the invention which accounts for positive drifts or shifts in the beacon timing. If the beacon timing is subjected to a positive time shift then the minimum value of the timing difference, which may be calculated in method 600, stage 621 FIG. 8, will be a more negative value than is represented by the timing after the positive shift in beacon timing.

The result is that the STA would be waking up earlier than it need and hence be in the powered state for longer than it need.

Method 900 may commence with stage 910 which notes the time of arrival of beacons.

Stage 910 may be followed by stage 921 where the number of beacons received is counted and compared to a preset value. In this way two sets of beacons consisting of a preset number may be used.

For each beacon set the initial beacon delay, 550 in FIG. 7, may be memorized. This may be accomplished by stage 931 which memorizes the initial beacon delay for one set of beacons, and stage 923 which memorizes the initial beacon delay for a second set of beacons.

Stage 950 may then compare the two values memorized in stages 921 and 922 and by so doing can determine if the beacon timing has drifted or jumped. For example, assume that the minimum timing difference is calculated over a set number, N beacons. For the first N beacons, it may be assumed that the minimum timing difference is calculated as having value −A, and then for beacons N to 2N, it may be assumed that the minimum timing difference is calculated as having value −B. If B is less than A then this may be interpreted as a positive shift in the beacon timing and the new correct value for minimum timing difference is reset from −A to the value −B. This value −B is then used to set the wake up time, WakeOffset, for the next set of N beacons, but it is important to note that the minimum timing difference for each set of beacons is established independently for each set of beacons. This then accounts and adjusts for positive time shift in the beacon timing.

Note also that if at any time the minimum value as determined from stage 551 in FIG. 7 for beacons N to 2N is less negative than −A, then the value for the minimum value for timing difference, in stage 551 and hence the calculated initial beacon delay value is set to that lesser value immediately. This automatically accounts for any negative time shift in the beacon timing. The period over which the STA may be waking up early, due to a positive time shift of the beacon, is therefore limited to the time over which each set of beacons is counted.

Figure 12:
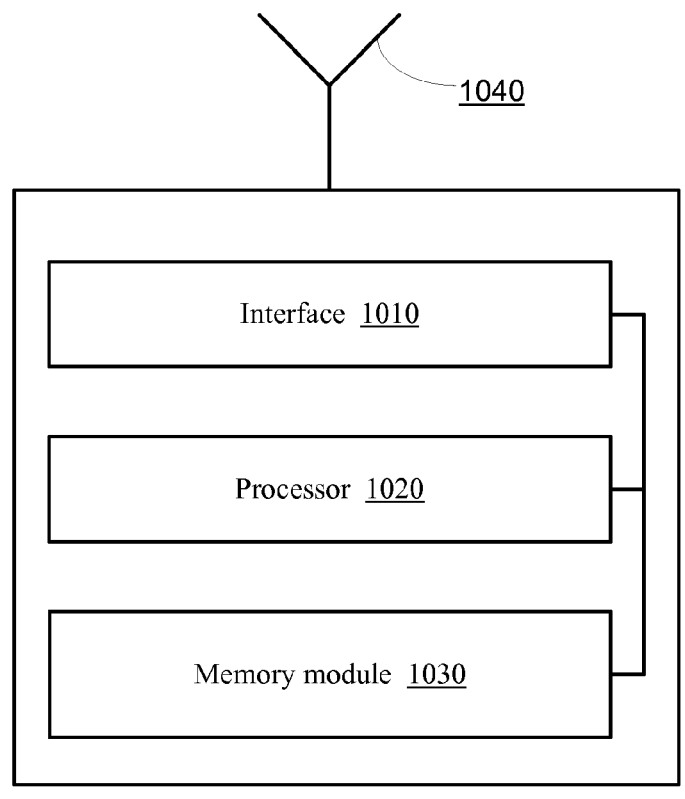
FIG. 12 illustrates a wireless communication device according to an embodiment of the invention.

FIG. 12 illustrates a wireless communication device 1000 according to an embodiment of the invention. The wireless communication device may be any device capable of wirelessly receiving and/or wirelessly transmitting signals and can execute any of the methods illustrated in the specification. It may be a station and the like. The wireless communication device 1000 includes interface 1010, processor 1020, memory module 1030 and one or more wireless antennas such as wireless antennas 1040. The interface 1010 may be a wireless receiver, a wireless transmitter, a combination thereof or a portion thereof. It may include, for example, at least a part of an analog and/or digital front end of a receiver, a transmitter or a combination thereof.

The interface 1010 and/or the processor 1020 may include elements for receiving, timing the reception of and decoding received signals (input signals, transmissions).

According to an embodiment of the invention the interface 1010 is arranged to receive input signals and the processor 1020 is arranged to measure the time of the reception of a beacon, calculate the estimated time of the next beacon and make calculations to determine and compensate for delays and jitter of the beacon transmissions. The memory module 1030 may store instructions for executing any method mentioned in the specification, input signals, results of processing of the processor 1020, signals to be outputted and the like.

According to an embodiment of the invention the interface 1010 is arranged to receive transmissions of another wireless communication device and the processor 1020 is arranged to instruct the interface 1010 to wake and sleep according to the determination of the estimated arrival times of beacons and the determination of the jitter and delay of the beacons in such a manner as to minimize the wake time of the interface 1010. Similarly processor 1020 may also instruct itself to enter a lower power state when the device 1000 is only required to wake for the reception of beacons.

According to an embodiment of the invention the interface 1010 is arranged to receive input signals and the processor 1020 is arranged to determine if a beacon has been missed and to then perform calculations that result in one or more actions that compensate for the missed beacon. Such actions may include updating the previously estimated time of arrival of the beacon and using that updated value as part of the calculations for the estimated time of arrival of the next beacon and calculations of the beacon jitter.

According to an embodiment of the invention the processor 1020 together with the memory interface 1030 is arranged to memorize the calculated delay of the initial beacon in one set consisting of a number of beacons, and to compare this with the calculated delay of the initial beacon in a second set of beacons. The two values are then compared at the conclusion of the second set in order to determine if there has been a positive drift in the beacon timing across the two sets which require a resetting of the wake up time of the device.

While the above descriptions contain many specifics, these should not be construed as limitations on the scope, but rather as an exemplification of one or several embodiments thereof. Many other variations are possible.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may cause the storage system to allocate disk drives to disk drive groups.

A computer program is a list of instructions such as a particular application program and/or an operating system.

The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

I claim:

1. A method for activating a wireless communication device, the method comprises:
    receiving, by the wireless communication device, a sequence of periodic transmissions;
    estimating, for each periodic transmission of the sequence of periodic transmissions and before a reception of the periodic transmission, an expected time of arrival of the periodic transmission;
    calculating, for each periodic transmission of the sequence of periodic transmissions, a timing difference attribute that is responsive to at least a difference between a timing of arrival of the periodic transmission and an expected time of arrival of the periodic transmission;
    selecting a selected periodic transmission out of the sequence of periodic transmissions, wherein the selected periodic transmission is associated with a smallest timing difference attribute out of the timing difference attributes associated with the periodic transmissions of the sequence of periodic transmissions;
    estimating, before a reception of a future periodic transmission that does not belong to the sequence of periodic transmissions, an estimated time of arrival of the future periodic transmission in response to the selecting of the selected periodic transmission and a periodic transmission period;
    determining a wakening time for wakening the wireless communication device by subtracting a safety period from the estimated time of arrival of the future periodic transmission; wherein a duration of the safety period decreases upon a successful reception of a set number of successive beacons; and
    wakening the wireless communication device at the wakening time and searching for the future periodic transmission.

2. The method according to claim 1 wherein the estimating, for each periodic transmission of the sequence of periodic transmissions, of the expected time of arrival of the periodic transmission is responsive to a timing of arrival of a preceding periodic transmission and the periodic transmission period of the sequence.

3. The method according to claim 2 wherein for each periodic transmission of the sequence the timing difference attribute of the periodic transmission is a sum of timing differences associated with all periodic transmissions of the sequence that do not follow the periodic transmission.

4. The method according to claim 1 wherein the estimating, for each periodic transmission of the sequence of periodic transmissions, of the expected time of arrival of the periodic transmission is responsive to (a) a timing of arrival of a preceding periodic transmission, (b) a timing difference between an estimated timing of arrival of the preceding periodic transmission and an actual timing of arrival of the preceding periodic transmission, and (c) the periodic transmission period of the sequence.

5. The method according to claim 1 comprising determining whether the wireless communication device missed a periodic transmission and wherein the determining of the wakening time is responsive to whether the wireless communication device missed the periodic transmission.

6. The method according to claim 1 comprising exponentially decreasing the duration of the safety period upon the successful reception of the set number of successive beacons.

7. The method according to claim 1 comprising exponentially increasing the duration of the safety period in responsive to a determination that one or more beacons have been missed.

8. The method according to claim 1 wherein the estimating of the estimated time of arrival of the future periodic transmission comprises subtracting a timing difference attribute of a last periodic transmission before the future periodic transmission from a sum of (a) a timing of arrival of the last periodic transmission before the future periodic transmission, (b) the periodic transmission period, and the smallest timing difference attribute.

9. The method according to claim 1 comprising searching for missed periodic transmissions and compensating for a missed periodic transmission.

10. The method according to claim 1 wherein the periodic transmission is a beacon.

11. A non-transitory computer readable medium that stores instructions that once executed by a wireless communication device cause the wireless communication device to:
    receive a sequence of periodic transmissions; estimate, for each periodic transmission of the sequence of periodic transmissions, an expected time of arrival of the periodic transmission;
    calculate, for each periodic transmission, a timing difference attribute that is responsive to at least a difference between a timing of arrival of the periodic transmission and an expected time of arrival of the periodic transmission;
    select a selected periodic transmission out of the sequence of periodic transmissions, wherein the selected periodic transmission is associated with a smallest timing difference attribute out of the timing difference attributes associated with the periodic transmissions of the sequence of periodic transmissions;
    estimate, before a reception of a future periodic transmission that does not belong to the sequence of periodic transmissions, an estimated time of arrival of the future periodic transmission in response to the selecting of the selected periodic transmission and a periodic transmission period;
    determine a wakening time for wakening a wireless communication device by subtracting a safety period from the estimated time of arrival of the future periodic transmission; wherein a duration of the safety period decreases upon a successful reception of a set number of successive beacons; and waken at the wakening time and searching for the future periodic transmission.

12. The non-transitory computer readable medium according to claim 11 wherein for each periodic transmission of the sequence the timing difference attribute of the periodic transmission is a sum of timing differences associated with all periodic transmissions of the sequence that do not follow the periodic transmission.

13. The non-transitory computer readable medium according to claim 11 that stores instructions for estimating, for each periodic transmission of the sequence of periodic transmissions, of the expected time of arrival of the periodic transmission in response to (a) a timing of arrival of a preceding periodic transmission, (b) a timing difference between an estimated timing of arrival of the preceding periodic transmission and an actual timing of arrival of the preceding periodic transmission, and (c) the periodic transmission period of the sequence.

14. The non-transitory computer readable medium according to claim 11 that stores instructions for determining whether the wireless communication device missed a periodic transmission and wherein the determining of the wakening time is responsive to whether the wireless communication device missed the periodic transmission.

15. The non-transitory computer readable medium according to claim 11 that stores instructions for calculating the wakening time as being equal to an expected time of reception of a next periodic transmission that minus a safety period.

16. The non-transitory computer readable medium according to claim 15 wherein a duration of the safety period is responsive to a success of the wireless communication device in receiving periodic transmissions.

17. A wireless communication device that comprises an interface and a processor;
wherein the interface is arranged to receive a sequence of periodic transmissions;
wherein the processor is arranged to:
estimate, for each periodic transmission of the sequence of periodic transmissions and before a reception of the periodic transmission, an expected time of arrival of the periodic transmission;
calculate, for each periodic transmission of the sequence of periodic transmissions, a timing difference attribute that is responsive to at least a difference between a timing of arrival of the periodic transmission and an expected time of arrival of the periodic transmission;
estimate, before a reception of a future periodic transmission that does not belong to the sequence of periodic transmissions, an estimated time of arrival of the future periodic transmission in response to a timing difference attribute of last periodic transmission before the future periodic transmission, a timing of arrival of the last periodic transmission before the future periodic transmission, and a periodic transmission period;
determine a wakening time for wakening the wireless communication device in response to the estimated time of arrival of the future periodic transmission;
wherein the wireless communication device is arranged to awaken at the wakening time and search for the future periodic transmission;
wherein the interface is arranged to receive the future periodic transmission; the future periodic transmission is received at an actual time of arrival of the future periodic transmission;

wherein the processor is further configured to
calculate, after the reception of the future periodic transmission, a timing difference attribute of the future periodic transmission that is responsive to at least a difference between the actual time of arrival of the future periodic transmission and the estimated time of arrival of the future periodic transmission;
find a minimal value out of the timing difference attribute of the future periodic transmission and a minimal timing attribute associated with a periodic transmission of periodic transmissions that preceded the future periodic transmission; and
set the timing difference attribute of the future periodic transmission to equal the minimal value.

18. The wireless communication device according to claim 17 wherein for each periodic transmission of the sequence the timing difference attribute of the periodic transmission is a sum of timing differences associated with all periodic transmissions of the sequence that do not follow the periodic transmission.

19. The wireless communication device according to claim 17 wherein the processor is configured to estimate the estimated time of arrival of the future periodic transmission by subtracting a timing difference attribute of a last periodic transmission before the future periodic transmission from a sum of (a) a timing of arrival of the last periodic transmission before the future periodic transmission, (b) the periodic transmission period, and the smallest timing difference attribute.

20. The wireless communication device according to claim 17 wherein the processor is configured to compensate for changes of values of the smallest timing difference attribute associated with different sequences of periodic transmissions.

21. The non-transitory computer readable medium according to claim 11 that stores instructions for estimating the estimated time of arrival of the future periodic transmission by subtracting a timing difference attribute of a last periodic transmission before the future periodic transmission from a sum of (a) a timing of arrival of the last periodic transmission before the future periodic transmission, (b) the periodic transmission period, and the smallest timing difference attribute.

22. The non-transitory computer readable medium according to claim 11 that stores instructions for compensating for changes of values of the smallest timing difference attribute associated with different sequences of periodic transmissions.

23. The method according to claim 1 that stores instructions for compensating for changes of values of the smallest timing difference attribute associated with different sequences of periodic transmissions.

24. The wireless communication device according to claim 17 wherein the processor is configured to determine the wakening time for wakening the wireless communication device by subtracting a safety period from the estimated time of arrival of the future periodic transmission; wherein a duration of the safety period decreases upon a successful reception of a set number of successive beacons.

25. The method according to claim 1 further comprising: receiving the future periodic transmission at an actual time of arrival of the future periodic transmission; calculating, after the reception of the future periodic transmission, a timing difference attribute of the future periodic transmission that is responsive to at least a difference between the actual time of arrival of the future periodic transmission and the estimated time of arrival of the future periodic transmission; finding a minimal value out of the timing difference attribute of the future periodic transmission and a minimal timing attribute associated with a periodic transmission of periodic transmissions that preceded the future periodic transmission; and setting the timing difference attribute of the future periodic transmission to equal the minimal value.

26. A non-transitory computer readable medium that stores instructions that once executed by a wireless communication device cause the wireless communication device to:

receive a sequence of periodic transmissions; estimate, for each periodic transmission of the sequence of periodic transmissions, an expected time of arrival of the periodic transmission;

calculate, for each periodic transmission, a timing difference attribute that is responsive to at least a difference between a timing of arrival of the periodic transmission and an expected time of arrival of the periodic transmission;

select a selected periodic transmission out of the sequence of periodic transmissions, wherein the selected periodic transmission is associated with a smallest timing difference attribute out of the timing difference attributes associated with the periodic transmissions of the sequence of periodic transmissions;

estimate, before a reception of a future periodic transmission that does not belong to the sequence of periodic transmissions, an estimated time of arrival of the future periodic transmission in response to the selecting of the selected periodic transmission and a periodic transmission period;

determine a wakening time for wakening a wireless communication device in response to the estimated time of arrival of the future periodic transmission;

waken at the wakening time and searching for the future periodic transmission;

receive the future periodic transmission at an actual time of arrival of the future periodic transmission;

calculate, after the reception of the future periodic transmission, a timing difference attribute of the future periodic transmission that is responsive to at least a difference between the actual time of arrival of the future periodic transmission and the estimated time of arrival of the future periodic transmission;

find a minimal value out of the timing difference attribute of the future periodic transmission and a minimal timing attribute associated with a periodic transmission of periodic transmissions that preceded the future periodic transmission; and set the timing difference attribute of the future periodic transmission to equal the minimal value.

27. The non-transitory computer readable medium according to claim 26 that stores instructions for estimating, for each periodic transmission of the sequence of periodic transmissions, of the expected time of arrival of the periodic transmission in response to a timing of arrival of a preceding periodic transmission and the periodic transmission period of the sequence.

* * * * *